Jan. 24, 1956      H. C. RAPP      2,732,422
ELECTRIC CABLE
Filed Sept. 17, 1952
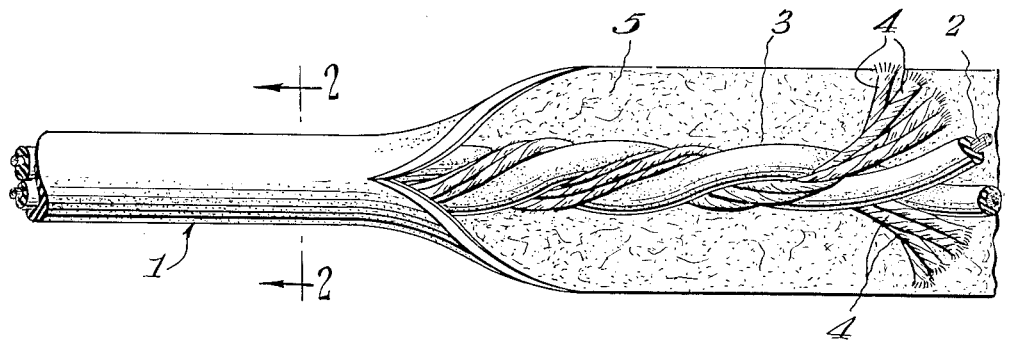
Fig. 1.
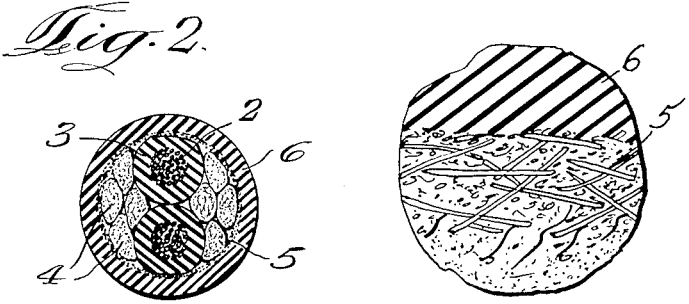
Fig. 2.
Fig. 3a.
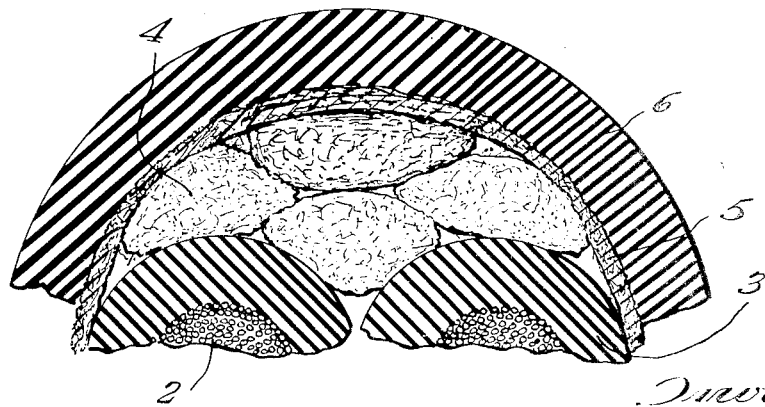
Fig. 3.
Inventor
Howard C. Rapp

United States Patent Office 2,732,422
Patented Jan. 24, 1956

2,732,422
ELECTRIC CABLE

Howard C. Rapp, Richmond, Ind., assignor to Belden Manufacturing Company, Chicago, Ill., a corporation of Illinois Application September 17, 1952, Serial No. 309,969

6 Claims. (Cl. 174—121)

The present invention relates in general to the construction of a flexible, multi-conductor electric cable which is provided with an outer insulating jacket and, more particularly, to an improved multi-conductor electric cable having an outer insulating jacket which can be easily stripped from the internal conductors of the cable.

Multi-conductor cables are widely used to transmit power to various apparatus, to interconnect electrical equipment, etc. Such cables generally include a plurality of insulated conductors which are twisted or cabled together along with fibrous filler material, so as to form a central assembly or core having a circular cross section; a separator which is disposed about the central assembly; and an insulating jacket which is disposed about the separator. A practical electric cable should have an outer jacket which is capable of being easily and cleanly stripped from the central assembly so as to expose the central insulated conductors. In addition, the outer jacket should not normally move or slide relative to the central assembly. Otherwise, the outer jacket would "bunch-up" or twist on the central assembly. The separator which is located between the outer jacket and the central insulating conductors plays an important part in determining the stripping characteristics and the amount of relative movement which is possible between the outer jacket and the central assembly of the electric cable.

Multi-conductor electric cables have previously been constructed with various types of separators. However, none of these constructions have proved to be entirely satisfactory. In one form of electric cable, the separator is comprised of a lateral wrap of paper tape. That is, the tape extends lengthwise of the cable and is wound laterally over the central assembly so as to completely encompass the cabled conductors and filler material. In the construction of an electric cable of this type, the outer jacket of the cable becomes bonded to the outer surface of the paper tape during the usual vulcanizing operation employed in forming the outer jacket. However, no bond is formed between the central assembly of the electric cable and the inner surface of the paper tape. The fibers of the paper tape are generally closely spaced and do not permit the material of the outer jacket to be extruded through the paper. The outer jacket of an electric cable having a paper tape separator is easily stripped from the central assembly. However, since there is no adhesion between the central assembly and the paper tape separator, relative movement is possible between the outer jacket and attached separator tape, and the central assembly. This relative movement between the central assembly and outer jacket causes a great deal of trouble in cord finishing operations because the outer jacket tends to stretch and pull over the end of the cable rather than strip off at any desired point. Furthermore, when the central conductors of the cable are assembled into plugs, the outer jacket has a tendency to work out of the plugs, leaving the conductors unprotected. In addition, when plugs are molded on such cables, the pressure employed in the molding process often displaces the outer jacket relative to the central assembly sufficiently to form a ring in back of the molded plug. Paper tape separators are therefore not completely satisfactory.

In another form of electric cable, the separator is comprised of cotton serving which is tightly and spirally wound around the central assembly. The outer jacket of this form of cable is generally bonded to the outer surface of the cotton serving but not to the central assembly. Although in this form of cable the material from the outer jacket does not penetrate through the cotton serving and the cotton serving is not bonded to the central assembly, the jacket nevertheless does not move relative to the central assembly. The reason for the stability of the position of the outer jacket relative to the central assembly is due to the fact that the serving is tightly and spirally wound around the central assembly, thereby forming a corrugated surface which grips the outer surface of the central assembly so as to maintain the central assembly in fixed position relative thereto. Thus, in this type of construction, there is no tendency for the outer jacket to pull back out of a plug or to become displaced during molding operations. However, the cotton serving does not strip off cleanly with the outer insulating jacket but instead leaves a residue of threads after the jacket is removed. This residue must be unwound and trimmed off by hand, which, of course, is undesirable. The use of this form of separator in an electric cable is also rather costly and requires rather complex manufacturing equipment.

The objects of the present invention are: to provide a flexible, multi-conductor electric cable with a separator which overcomes the disadvantages commonly experienced in such a cable when the prior art separators are employed; to provide an improved, multi-conductor electric cable which includes a flexible, outer jacket which grips the central assembly and at the same time permits the jacket to be cleanly and easily stripped from the central assembly; and to provide a flexible multi-conductor cable having a separator positioned between the outer insulating jacket and the inner assembly, which separator material permits the material forming the outer insulating jacket to extend through the separator tape and grip the central assembly and which permits clean stripping thereof together with the outer jacket from the central assembly.

As will hereinafter appear, the objects of the invention are achieved by a multi-conductor electric cable which is provided with a porous, non-woven tape separator of particular design disposed between the outer insulating jacket and the central assembly of the cable. The porous, non-woven tape, when fabricated in the particular manner hereinafter set forth, makes possible the adhesion of the flexible insulating jacket to the fibrous filler material of the central assemby while still permitting the outer jacket together with the separator tape to be easily stripped from the central assembly.

Further objects and advantages of the present invention will be made apparent in the accompanying drawings and the following description of one preferred embodiment of the invention.

Fig. 1 is a perspective view of a length of multi-conductor cable constructed in accordance with the present invention with a portion of the outer jacket cut longitudinally and split open to thereby disclose the central cable assembly construction;

Fig. 2 is a sectional view taken along line 2—2 of Fig. 1; and

Fig. 3 is an enlarged view of one segment of Fig. 2, and

Fig. 3a is an enlarged view of the boundary between the non-woven tape separator and outer insulating jacket of Fig. 3.

The multi-conductor cable 1 illustrated in the drawings includes the central conductors 2, each of which are formed of a cylindrical bundle of flexible wire strands. The conductors 2 are covered by individual sheaths of an elastomer insulating material 3 such as rubber, neoprene, etc. and are twisted together in helical turns. The spaces or valleys between the twisted insulated conductors are filled to an approximately circular cross section with suitable filler material, such as a fibrous or textile mass, e. g., jute filler cord. The central assembly consisting of the central insulated conductors and the filler material is enclosed in a sheath or separator 5 comprised of a lateral wrap of a porous, relatively heat-resistant, non-woven tape and an outer jacket 6 comprised of a vulcanizable elastomer such as natural rubber, neoprene, butyl rubber, hycar, etc. is extruded or otherwise formed about the separator and subsequently vulcanized. The material of the outer jacket 6 extends through the pores or passageways formed by the fibers in the separator 5 and extends about and is bonded to at least some of the outer fibers of the filler material 4.

The tape used for the separator is formed from superposed layers of either natural or synthetic fibers. The tape may be formed by any process, for example, by an air-laying process, wherein the fibers are deposited in a haphazard, non-directional manner so as to form a tape or web having tortuous passageways therethrough. The fibers of the tape are generally bonded together by an adhesive which may be applied, for example by spraying during the air-laying operation. The bonded fibers of the tape may be compressed into a relatively thin sheet during manufacture, however, the compression must not be so great as to eliminate the tortuous passageways through the various layers of fibers in the tape. The fibers and bonding material used in forming the tape should be sufficiently heat-insensitive so as not to become soft and tacky at temperatures ordinarily encountered in extrusion and vulcanizing processes, i. e., between 340° and 390° F. The tape should be of sufficient width so as to completely encompass the central assembly of the electric cable so as to be capable of being laterally wound therearound.

In forming the multi-conductor cable, the insulated central conductors are coated with talc prior to the formation of the central assembly. The talc coating on the central insulating conductors serves a dual purpose; it prevents the insulation 3 of the central conductors 2 from sticking to the filler material 4 during the formation of the central assembly; and it prevents the insulated conductors from becoming bonded to the material of the outer jacket when the outer jacket 6 is formed about the central assembly.

The porous, non-woven tape may be laterally wound around the surface of the central cable assembly by an appropriately shaped die, for example, such as is disclosed in the patent to Wermine, No. 1,693,630, issued December 4, 1928. After the non-woven tape or separator is disposed about the cabled conductors, the outer jacket is formed about the entire assemblage. This may be accomplished by running the central assembly and surrounding separator through any usual type extruding machine which will extrude a vulcanizable elastomer jacket around and through the porees of the separator. A portion of the material of the outer jacket which is extruded through the separator extends around and becomes bonded to the loose outer fibers of the filler material 4. The entire assemblage is then passed through the usual vulcanizing chamber maintained at a temperature of between 340° and 390° F., which temperature is sufficient to vulcanize the elastomeric material forming the outer jacket 6. Because of the talc which is present on the surface of the insulation 3 of the central conductors 2, the elastomeric material of the outer jacket does not become bonded to the central insulated conductors.

The diameter of the fibers in the tape which is formed into the separator; the thickness of the tape; the percentage of the volume of the tape which is occupied by the fibers; and the average cross section area of the passageways in the tape must be maintained within definite limits in order to achieve the desired flexibility and easy strip characteristics in the finished cable. For proper results, the fiber diameters of the tape should be between 10 and 25 microns; the thickness of the tape should be between 100 and 200 microns; and the fibers of the tape should occupy between 15 and 40 per cent of the total volume of the tape. When these conditions are achieved, the cross sectional area of the passageways or pores in the tape will vary from a very small value to a maximum area of about 15,000 square microns with an average cross sectional area of about 5,000 square microns.

A multi-conductor electric cable formed in the manner outlined above will be flexible and will have a smooth, uniform, cylindrical outer jacket which has no tendency to pull back, twist, or "bunch-up" over the central assembly. The outer insulating jacket together with the non-woven separator may be easily stripped from the central conductors and the fibrous filler material. This is accomplished by cutting through the outer jacket of the electric cable and pulling the portion of the jacket which is to be stripped longitudinally of the remainder of the cable. Since material of the outer jacket extends through the pores of the separator and since the bond between the material of the outer jacket and the fibers of the separator is much stronger than the bond between the adjacent fibers of the separator, that portion of the separator which is not cut along with the outer jacket will pull away from the adjacent fibers of the separator at the point of juncture of the outer insulated jacket. The separator thus breaks cleanly and strips away along with the outer jacket. A stronger bond also exists between the material of the outer jacket and the fibers of the filler material with which it engages than between the individual fibers of the filler material. The fibers of the filler material which are in contact with the material of the outer jacket are therefore pulled away from the main body of the filler material when the outer jacket is stripped from the inner assembly.

One commercial electric cable formed in accordance with the present invention includes two No. 16 A. W. G. stranded insulated conductors and 8 strands of jute filler cord which are wound together to form the central cable assembly. The separator used in this cable is formed from a one-inch strip of a thin, porous, air-laid sheet of viscose rayon fibers which are bonded together by a polyvinyl acetol resin adhesive. This tape has an average thickness of about 150 microns and weighs approximately 350 grains per square yard. The fibers of this tape have an average diameter of around 60 microns and approximately 30 per cent volume of the tape is occupied by the fibers. The outer insulating jacket which is extruded around the tape is made from a rubber compound having an extension of approximately 300 per cent and had an average thickness of $\frac{1}{32}$ of an inch.

The outer insulating jacket of this cable is applied to the wire in a continuous vulcanizing apparatus similar to the apparatus disclosed in the Forstrom patent, No. 2,069,087. The jacket is vulcanized in the apparatus at a temperature of 380° F. The central assembly, including the porous, non-woven separator, is drawn through the extrusion die under such relative tension that the filler cord and tape has an unstressed length approximately equal to the axial length of the central twisted conductors.

The outer jacket of this cable, together with the porous, non-woven separator can be stripped, cleanly and easily, by any of the conventional stripping methods employed in the electrical art. This cable also has the requisite flexibility desired in such cables.

Other electric cables have been made in accordance with the present invention, i. e., cables which incorporate a porous, non-woven tape separator of the type described, and have proved to be very satisfactory. Such cables have been made with inner conductors ranging from sizes 30 A. W. G. to 14 A. W. G. and having an outer jacket with a thickness of from $\frac{1}{64}$ of an inch to $\frac{5}{64}$ of an inch.

An electric cable which includes a separator as has been described has overcome the disadvantages in the previously known electric cables. The present electric cable includes a separator which is inexpensive; easy to apply; adheres to the outer jacket; does not appreciably stiffen the cable; and aids in the stripping of the outer jacket from the cable. The outer jacket of such cables does not become displaced relative to the inner conductors during use and strips readily and cleanly in the cord finishing operation.

Various of the features of the invention which are believed to be new are set forth in the accompanying claims.

I claim:

1. An electric cable having easy stripping characteristics comprising a plurality of elongated metallic conductors, an insulating coating surrounding each conductor, said insulated conductors being wound around each other throughout their respective lengths, fibrous filler material spirally wound with said insulated conductors in such manner as to form a central assembly having a generally circular cross section, a porous, non-woven tape laterally disposed about and enveloping the central assembly and a jacket of flexible insulating material disposed about said porous tape, a portion of said insulating material of said jacket extending through the pores of said tape and being adhesively secured to at least some of the outer fibers of the filler material.

2. An electric cable having easy stripping characteristics comprising a plurality of elongated metallic conductors, an insulated coating surrounding each conductor, said insulated conductors being spirally wound around each other throughout their respective lengths, fibrous filler material spirally wound with said insulated conductors in such manner as to form a common assembly having a generally circular cross section, a porous, non-woven tape laterally disposed about and enveloping the central assembly, said tape being formed of fibers and bonding material which are unaffected by temperatures below around 400° F., said tape being formed of superimposed fibers arranged in haphazard directions, adjacent fibers of said tape defining therebetween tortuous passageways which extend through the tape, and a jacket of flexible insulating material disposed about said porous tape, a portion of said insulating material of said jacket extending through the tortuous passageways which constitute the pores of said tape and being adhesively secured to at least some of the outer fibers of the filler material.

3. An electric cable having easy stripping characteristics comprising a plurality of elongated metallic conductors, an insulated coating surrounding each conductor, said insulated conductors being spirally wound around each other throughout their respective lengths, fibrous filler material spirally wound with said insulated conductors in such manner as to form a common assembly having a generally circular cross section, a porous, non-woven tape laterally disposed about and enveloping the central assembly, said tape being formed of fibers and bonding material which are unaffected by temperatures below around 400° F., said tape being formed of superimposed fibers arranged in haphazard directions, adjacent fibers of said tape defining therebetween tortuous passageways which extend through the tape, the average cross sectional area of said passageways being around 5,000 square microns, and a jacket of flexible insulating material disposed about said porous tape, a portion of said insulating material of said jacket extending through the tortuous passageways which constitute the pores of said tape and being adhesively secured to at least some of the outer fibers of the filler material.

4. An electric cable having easy stripping characteristics comprising a plurality of elongated metallic conductors, an insulated coating surrounding each conductor, said insulated conductors being spirally wound around each other throughout their respective lengths, fibrous filler material spirally wound with said insulated conductors in such manner as to form a common assembly having a generally circular cross section, a porous, non-woven tape laterally disposed about and enveloping the central assembly, said tape being formed of fibers and bonding material which are unaffected by temperatures below around 400° F., said tape being formed of superimposed fibers arranged in haphazard directions, adjacent fibers of said tape defining therebetween tortuous passageways which extend through the tape, the fibers of said tape having diameters between 10 and 25 microns and occupying between 15 and 40 per cent of the total volume of said tape, the thickness of said tape being between 100 and 200 microns, and a jacket of flexible insulating material disposed about said porous tape, a portion of said insulating material of said jacket extending through the tortuous passageways which constitute the pores of said tape and being adhesively secured to at least some of the outer fibers of the filler material.

5. A flexible electric cable having easy stripping characteristics comprising a plurality of elongated metallic conductors, an insulated coating surrounding each conductor, said insulated conductors being spirally wound around each other throughout their respective lengths, fibrous filler material spirally wound with said insulated conductors in such manner as to form a common assembly having a generally circular cross section, a porous, non-woven tape laterally disposed about and enveloping the central assembly, said tape being formed of superimposed fibers of viscose rayon arranged in haphazard directions and bonded together by a polyvinyl acetol resin adhesive, adjacent fibers of said tape defining therebetween tortuous passageways extending through the tape, said passageways having an average cross sectional area of approximately 5,000 square microns, and a jacket of flexible insulating material disposed about said porous tape, a portion of said insulating material of said jacket extending through the tortuous passageways which constitute the pores of said tape and being adhesively secured to at least some of the outer fibers of the filler material.

6. A flexible electric cable having easy stripping characteristics comprising a plurality of elongated metallic conductors, an insulated coating surrounding each conductor, said insulated conductors being spirally wound around each other throughout their respective lengths, fibrous filler material spirally wound with said insulated conductors in such manner as to form a common assembly having a generally circular cross section, a porous, non-woven tape laterally disposed about and enveloping the central assembly, said tape being formed of superimposed viscose rayon figers arranged in haphazard directions and bonded together by a polyvinyl acetol resin adhesive, adjacent fibers of said tape defining therebetween tortuous passageways extending through the tape, the fibers of said tape having diameters between 10 and 25 microns and occupying between 15 and 40 per cent of the total volume of said tape, the thickness of said tape being between 100 and 200 microns, and a jacket of flexible insulating material disposed about said porous tape, a portion of said insulating material of said jacket extending through the tortuous passageways which constitute the pores of said tape and being adhesively secured to at least some of the outer fibers of the filler material.

References Cited in the file of this patent

UNITED STATES PATENTS

| Number | Name | Date |
|---|---|---|
| 1,895,927 | Hull | Jan. 31, 1933 |
| 2,076,667 | Pombo | Apr. 13, 1937 |
| 2,544,233 | Kennedy | Mar. 6, 1951 |
| 2,572,407 | Talet et al. | Oct. 23, 1951 |
| 2,578,534 | Giles et al. | Dec. 11, 1951 |